United States Patent
von Khurja et al.

(10) Patent No.: US 8,312,444 B2
(45) Date of Patent: Nov. 13, 2012

(54) METHOD FOR OPTIMIZING MEMORY MODULES FOR USER-SPECIFIC ENVIRONMENTS

(75) Inventors: Michael von Khurja, Ludwigsburg (DE); Anthony Leach, Cheshire (GB)

(73) Assignee: OCZ Technology Group, Inc., San Jose, CA (US)

( * ) Notice: Subject to any disclaimer, the term of this patent is extended or adjusted under 35 U.S.C. 154(b) by 1145 days.

(21) Appl. No.: 12/179,715

(22) Filed: Jul. 25, 2008

(65) Prior Publication Data

US 2009/0037900 A1 Feb. 5, 2009

Related U.S. Application Data

(60) Provisional application No. 60/952,713, filed on Jul. 30, 2007.

(51) Int. Cl.
*G06F 9/44* (2006.01)
(52) U.S. Cl. ....................................................... 717/173
(58) Field of Classification Search ........... 717/168–173
See application file for complete search history.

(56) References Cited

U.S. PATENT DOCUMENTS

| | | | |
|---|---|---|---|
| 6,074,434 A * | 6/2000 | Cole et al. | 717/173 |
| 2004/0225894 A1 * | 11/2004 | Colvin | 713/200 |
| 2007/0058470 A1 * | 3/2007 | Nierle et al. | 365/221 |

* cited by examiner

*Primary Examiner* — Anna Deng
(74) *Attorney, Agent, or Firm* — Hartman Global IP Law; Gary M. Hartman; Domenica N. S. Hartman

(57) ABSTRACT

A method for altering and preferably optimizing the performance of system memory of a computer system. The method includes identifying the motherboard and the memory module of the computer system, and then searching multiple SPD update files associated with multiple motherboards and containing data corresponding to physical and operational characteristics of multiple memory modules. From these SPD update files, a compatible SPD update file is identified that is compatible with the motherboard and contains data corresponding to physical and operational characteristics of the memory module. Thereafter, a software utility is used to erase pre-existing SPD data stored on the SPD circuit device and then write and verify installation of the data of the compatible SPD update file on the SPD circuit device. New SPD settings for the memory module are then enabled based on the data of the compatible SPD update file.

17 Claims, 2 Drawing Sheets

METHOD FOR OPTIMIZING MEMORY MODULES FOR USER-SPECIFIC ENVIRONMENTS

CROSS REFERENCE TO RELATED APPLICATIONS

This application claims the benefit of U.S. Provisional Application No. 60/952,713, filed Jul. 30, 2007, the contents of which are incorporated herein by reference.

BACKGROUND OF THE INVENTION

The present invention generally relates to system memory and related components of computer systems. More particularly, this invention relates to a method for altering and preferably optimizing the performance of system memory by tailoring the performance of one or more memory modules to the motherboard of the computer system.

The performance of personal computers depends on the individual components used in its design as well as the interaction between the components. One specific case in point is the system memory. Until the introduction of synchronous DRAM, most memory modules were built according to the best price/performance ratio any manufacturer could define in their specific product. Very often, the deviations from one design to another led to compatibility issues meaning that one computer would only run with a specific module series but not with others, even if the latter were compliant with the general outlines of the specifications.

With the introduction of Synchronous DRAM, Intel Corporation pushed the PC100 and PC66 specifications into the DRAM marketplace, by which a presence indicator was required to enable automatic recognition of a memory module in any given slot. This presence detect feature was incorporated on an Electrically Erasable Programmable Read Only Memory (EEPROM) on the memory module, and interfaced with the motherboard over a dedicated serial bus rather than the parallel command address and data buses used for interfacing between the memory chips on the memory module and the memory controller on the motherboard. This EEPROM is commonly referred to as "Serial Presence Detect" or SPD. In addition to signaling the presence of one or more physical banks, the SPD also contains the entire functional datasheet of the memory module, that is, data corresponding to various physical and operational characteristics of the module, including the number of banks, rows, and columns, and performance parameters such as operating frequency and access latencies, and thermal data relating to specific modes of operation and the presence or absence of heatspreaders. As a result, the SPD is an important factor toward a plug and play implementation of system memory, where any platform-compliant module can be inserted into any open slot and the system will correctly recognize the module and choose the appropriate operating parameters.

The data contained in the SPD are used by the motherboard to configure the mode of operation of the memory controller. That is, the system will boot and run the memory at the frequency specified in the SPD with the latency parameters also specified in the SPD. This aspect of SPDs allows memory manufacturers to program the modules according to their own test criteria and specifications. Recently, there have been extensions to the SPD data that enable platform and user-specific performance modes.

Firmware that contains device-specific data to allow plug and play integration of the device into existing systems is a standard feature of most current computer components. Most motherboards allow upgrading of the firmware or BIOS (basic input-output system) by reprogramming the EEPROM chip onto which the firmware or BIOS is incorporated. Similarly, most graphics cards feature a reprogrammable BIOS, and the same holds for hard disc drives, optical storage drives, network cards, and even integrated peripheral controllers such as RAID controllers. In the latter case, the firmware upgrade is usually an integral part of the motherboard BIOS and will be programmed along with a motherboard BIOS update. Historically, BIOS updates or BIOS flashing has been performed from a DOS prompt or from a utility integrated into the main BIOS that makes the flash utility independent of the operating system used by the computer. Windows® 2000 and XP® also support "Windows®-based" flash utilities, such as Phoenix-Award's Winflash.

BIOS updates have become an important part of personal computing in the enthusiast market, since in many cases it is the end-user feedback that provides the necessary information about bugs in the product that are then fixed in subsequent BIOS revisions. The access of online data bases containing the latest BIOS versions released by any manufacturer allows access and download of the latest binaries. However, such BIOS updates are currently restricted to primarily motherboards, with only a few examples of BIOS updates for other devices such as RAID controllers and graphics adapters being available. In general, BIOS updates work by accessing the EEPROM via a serial bus interface, checking the compatibility of the new BIOS file with the existing hardware based on an ID string, erasing the existing data from the BIOS block and rewriting the binaries to the ROM.

An issue constantly faced by all manufacturers of computer components is that despite the high level of standardization, there is still a substantial fragmentation of the market driven primarily by the need for product differentiation. On the upside, this fragmentation results in optimization; on the downside, however, the result can be compatibility issues or the optimization may not be implemented correctly. Since there are dozens of motherboard manufacturers with several models each, and each motherboard model can go through several firmware or BIOS updates, standardization hits its limitations when it comes to a one-size-fits-all solution regarding memory modules. The result is often finger-pointing between the motherboard and the memory manufacturer and often ends in a compromise that is based on compatibility with other brands in either product category.

A possible solution for this problem would be to allow the motherboard to choose data from a library of SPD entries that is the most suitable for the specific system. In a small scale, this is implemented in the form of frequency versus column address strobe (CAS) latency values stored by the SPD, by which the system can be told to adjust the frequency according to the CAS latency selected. If the system does not power up at the highest frequency, it defaults one step back to the next lower frequency. However, a full implementation of an entire library of SPD data tables featuring all electrical and timing parameters for even the most common boards available at the time of sale far exceeds the capacity of current SPDs. Moreover, SPD content is standardized by the Joint Electron Device Engineering Council (JEDEC) and any change in the overall layout of the SPD data will need to be approved and incorporated into the standard. Therefore, this course of action cannot be considered a solution for the immediate problem of memory optimization.

SUMMARY OF THE INVENTION

The present invention provides a method for altering and preferably optimizing the performance of system memory of a computer system that includes a motherboard and at least one memory module having an SPD circuit device. More particularly, the invention enables tailoring of the performance of the memory module to the motherboard.

According to a preferred aspect of the invention, the method includes identifying the motherboard and the memory module, and then searching a plurality of SPD update files associated with a plurality of motherboards and containing data corresponding to physical and operational characteristics of a plurality of memory modules. From the plurality of SPD update files, a compatible SPD update file is identified based on the identities of the motherboard and the memory module. The compatible SPD update file is associated with the motherboard and contains data corresponding to physical and operational characteristics of the memory module. Thereafter, a software utility is used to erase pre-existing SPD data stored on the SPD circuit device and then write and verify installation of the data of the compatible SPD update file on the SPD circuit device. New SPD settings for the memory module are then enabled based on the data of the compatible SPD update file.

In view of the above, it can be seen that significant advantages of the invention include the capability of installing and using custom SPD settings to custom-tailor a memory module to an existing or replacement motherboard, or tailor the operation of the memory module following a BIOS upgrade of the motherboard. New SPD settings can be installed with low risk involved in updating the memory module, at low or no cost to end-users, and without the need for shipping memory modules to the module manufacturer to update the SPD.

Other objects and advantages of this invention will be better appreciated from the following detailed description.

DETAILED DESCRIPTION OF THE INVENTION

The current invention provides a procedure for optimizing the performance of the system memory of a computer by updating the SPD settings of one or more memory modules installed on the motherboard of the computer. The procedure is particularly well suited for optimizing the settings of an SPD EEPROM of a memory module for a specific motherboard. The procedure is also well-suited for, but not limited to, enhancing or ensuring the proper operation of memory modules on a motherboard following a firmware or BIOS upgrade on the motherboard, or ensuring the proper operation of a memory module on a different motherboard. The construction, components, operation, use, etc., of computers (including IBM PC-compatible and Apple Macintosh), computer motherboards, system memory, and memory modules are well known in the art and therefore will not be described in any detail here, and these and all foreseeable variations thereof are within the scope of this invention.

According to a preferred embodiment of the invention, the procedure and software utility use the system management bus (SMBus or SMB) of the motherboard to access and communicate with an EEPROM on which is incorporated the SPD of the memory module. As known in the art, the SMBus is a bus used to access (by device ID) and communicate with certain low-bandwidth devices on a motherboard, for example, power-related chips such as laptop rechargeable battery subsystems, temperature, fan, and voltage sensors, etc. In the present invention, the procedure and software utility use the SMBus to access and communicate with the motherboard's memory slot at which a serial EEPROM is identified, in particular, the SPD EEPROM, whose device ID shows up as a "Module" using the software utility. Once the Module has been accessed and identified by the utility, an end-user can prompt the utility to back-up the existing SPD or to update the SPD with data from an SPD update file. The actual flashing of the EEPROM to perform this procedure can follow the same routine as any other flash routine, for example, the routine that would be followed to flash the BIOS EEPROM on the same motherboard. In this manner, the SPD EEPROM can first be erased and then rewritten with the new data corresponding to the chosen update file.

As evident from the above, the procedure and software utility are intended for use by an end-user, as opposed to procedures and software utilities intended for exclusive use by manufacturers of memory modules and motherboards. As used herein, the term "end-user" denotes an individual of the group of individuals who ultimately operates the computer system in which the motherboard is installed.

Figure 1:
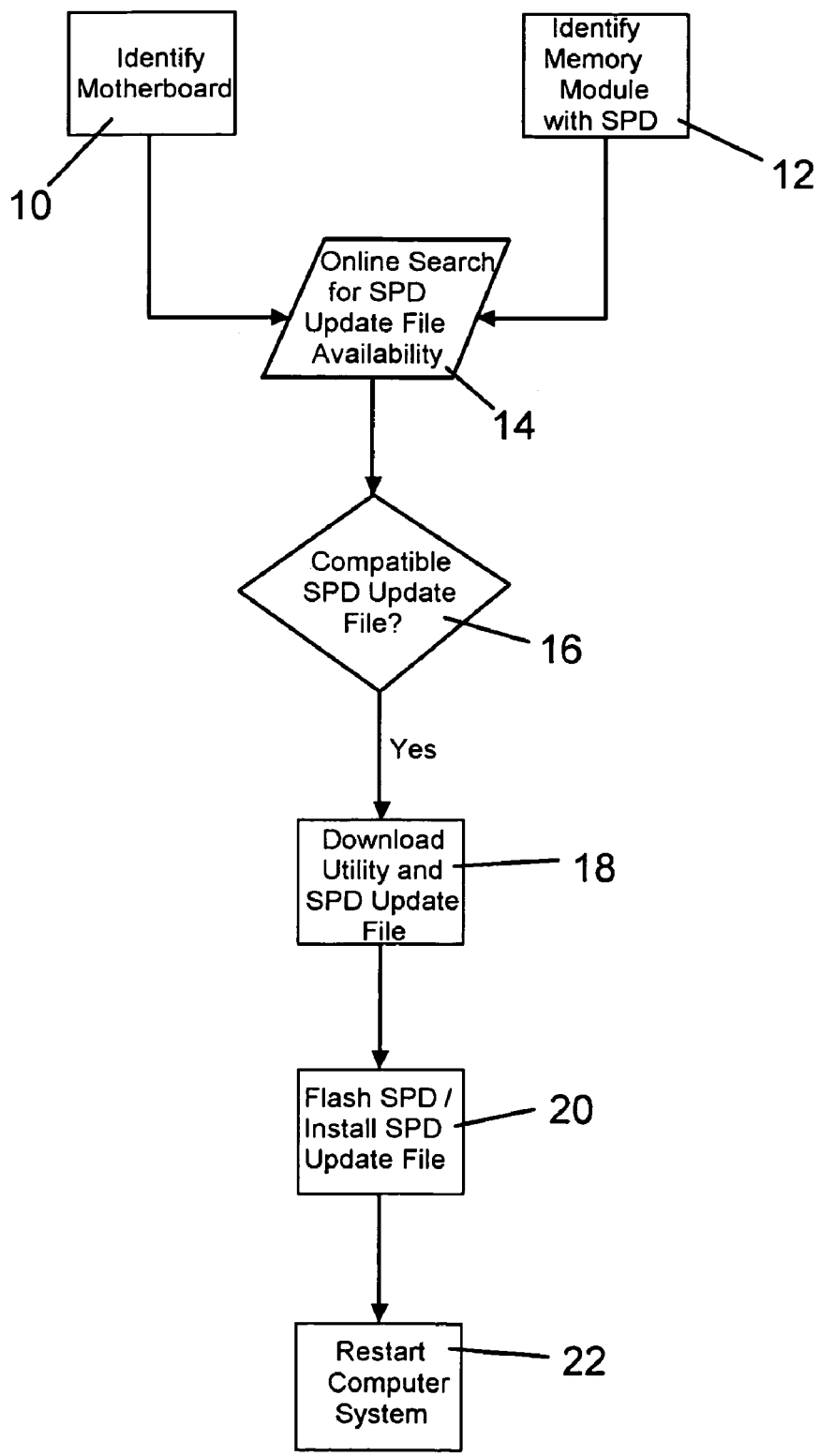
FIG. 1 shows a flow diagram of the procedure of identification of a compatible motherboard and memory configuration and subsequent download of a motherboard-specific SPD configuration file followed by flashing of the SPD to achieve a custom-tuned system.

In the preferred embodiment represented in FIG. 1, based on the model of the motherboard (step 10) and the type of memory module (step 12), the end-user can perform a search (step 14) of multiple SPD update files (e.g., binary files) available from the manufacturer of the memory module, for example, made accessible on the Internet. Also in the preferred embodiment, each type of memory module from a module manufacturer is compatible with multiple SPD update files within a module-specific selection of SPD update files offered by the manufacturer. Manufacturers of memory modules can establish libraries of SPD update files that are specific for a given "Stock Keeping Unit" (SKU) of memory modules. Within the selected module-specific group, each motherboard covered by its file library preferably has a specific SPD update file containing data that are optimized for one or more specific motherboards offered by one or more motherboard manufacturers.

Figure 2:
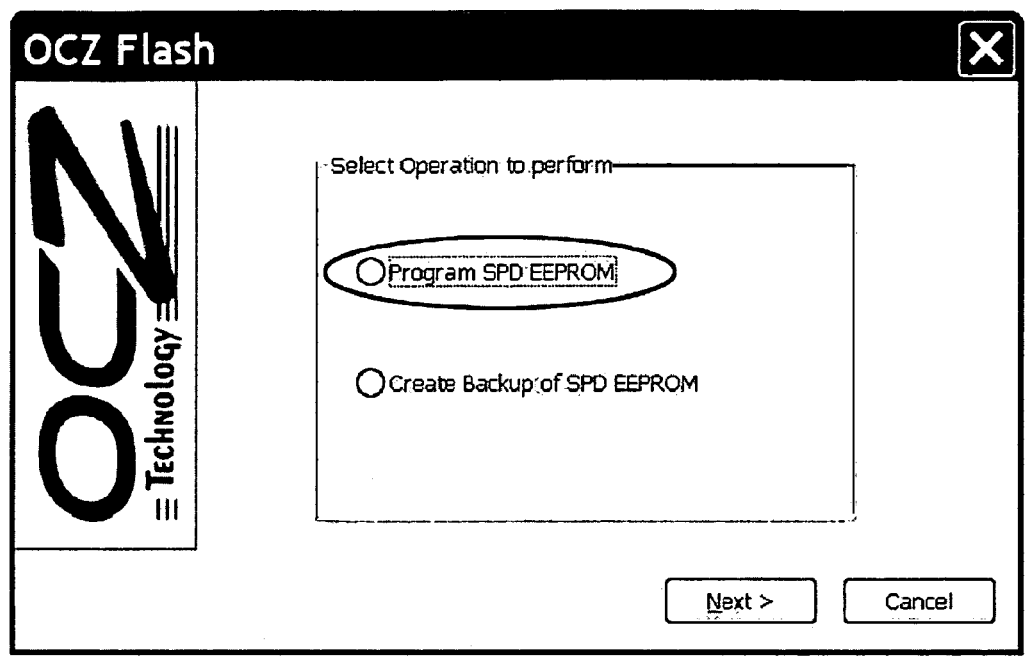
FIG. 2 shows two screenshots of a beta version, and represent steps of the procedure of FIG. 1.
Figure 2:
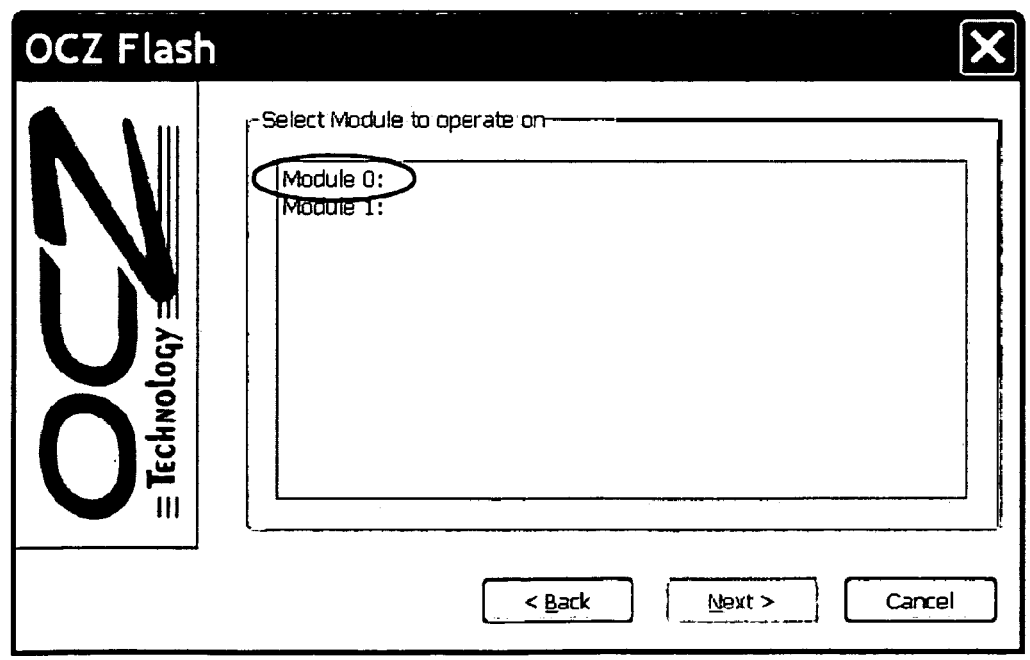

On finding and choosing a compatible SPD update file (step 16), the end-user preferably downloads (step 18) the chosen SPD update file and a software utility that the module manufacturer may create and provide to end-users to perform and ensure proper installation of the update file for the identified memory module. The software utility will in most cases be Windows-based, though other platforms are foreseeable and within the scope of this invention. Such software is well within the capability of those skilled in the art who are familiar with software employed to upgrade firmware or BIOS on computer motherboards. The software utility may include the option of performing a compatibility test to verify the correct SPD image for the memory module to be flashed. Verification can encompass various parameters, such as address space parameters and frequency and latency settings of the particular module. Prior to flashing the SPD EEPROM and installing the SPD update file (step 20), the end-user can prompt the software utility to back-up the existing SPD prior to updating the SPD, as represented by the upper screenshot in FIG. 2. As known in the art, flashing of the SPD EEPROM generally entails erasing the EEPROM, which is then rewritten with the data of the new SPD update file to the EEPROM.

After the software utility has written the SPD update file selected by the end-user to the EEPROM, the correct programming of the EEPROM can be verified with the utility, which then prompts the end-user to restart the computer system (step 22) in order to enable the new SPD settings and enable the system to take advantage of the optimizations. As an added safety feature, the software utility may also prompt the end-user to reboot the system at non-overclocked settings to reduce the risk of a system crash that might leave the memory module without SPD, and therefore without any means of being detected by the system. The process described above and represented in FIG. 1 can be repeated as often as desired with the retention rate of the EEPROM being the only limitation. Furthermore, the software utility can prompt the end-user to repeat the procedure for any additional memory modules of the memory system, as represented by the lower screenshot in FIG. 2

While the invention has been described in terms of a preferred embodiment, it is apparent that other forms could be adopted by one skilled in the art. For example, the physical configurations of the computer system, motherboard, and memory modules can widely vary, and the software utility or another utility can be used to perform various steps in addition to those noted. Therefore, the scope of the invention is to be limited only by the following claims.

The invention claimed is:

1. A method for allowing an end-user to alter performance of a system memory of a computer system, the computer system comprising a motherboard and at least one memory module having a Serial Presence Detect (SPD) circuit device that contains data corresponding to physical and operational characteristics of the memory module, the method comprising:

Identifying the motherboard and identifying the at least one memory module by accessing and communicating with the SPD circuit device;

searching a plurality of SPD update files associated with a plurality of motherboards and containing data corresponding to physical and operational characteristics of a plurality of memory modules;

identifying module-specific SPD update files from the plurality of SPD update files based on the identified at least one memory module;

identifying a compatible SPD update file from the module-specific SPD update files based on the identified motherboard, the compatible SPD update file being associated with the motherboard and containing data corresponding to physical and operational characteristics of the at least one memory module;

the end-user using a software utility to erase pre-existing SPD data stored on the SPD circuit device and then write and verify the writing of the data of the compatible SPD update file on the SPD circuit device; and enabling new SPD settings for the at least one memory module based on the data of the compatible SPD update file.

2. The method according to claim 1, wherein the searching and identifying steps are performed over a network of computers.

3. The method according to claim 1, wherein the searching and identifying steps are performed online over the Internet.

4. The method according to claim 3, wherein the software utility and the compatible SPD update file are downloaded from the Internet.

5. The method according to claim 4, wherein the software utility and the compatible SPD update file are provided on the Internet by a manufacturer of the at least one memory module.

6. The method according to claim 5, wherein the searching step is performed by first identifying the motherboard among the plurality of motherboards, and then searching through the plurality of SPD update files which are associated with the motherboard.

7. The method according to claim 1, wherein the searching step is performed by first identifying the motherboard among the plurality of motherboards, and then searching through the plurality of SPD update files which are associated with the motherboard.

8. The method according to claim 1, wherein the new SPD settings enhance the performance of the at least one memory module for operation with the motherboard.

9. The method according to claim 1, wherein the software utility accesses and communicates with the SPD circuit device through a system management bus of the motherboard.

10. The method according to claim 1, wherein the SPD circuit device is an EEPROM Electrically Erasable Programmable Read Only Memory (EEPROM).

11. The method according to claim 1, wherein the compatible SPD update file is a binary file.

12. The method according to claim 1, further comprising backing-up the pre-existing data stored on the SPD circuit device prior to installing the data of the compatible SPD update file on the SPD circuit device.

13. The method according to claim 1, wherein the enabling step comprises rebooting the computer system.

14. The method according to claim 1, wherein the software utility verifies the installation of the compatible SPD update file by a process that comprises comparing at least one of the address space parameters, frequency, and latency settings of the at least one memory module and the compatible SPD update file.

15. The method according to claim 1, wherein the method is performed following a firmware or BIOS upgrade on the motherboard.

16. The method according to claim 1, wherein the method is performed to ensure proper operation of the at least one memory module on a different motherboard.

17. The method according to claim 1, wherein the computer system operates with a Windows-based operating system.

* * * * *